Figure 1:
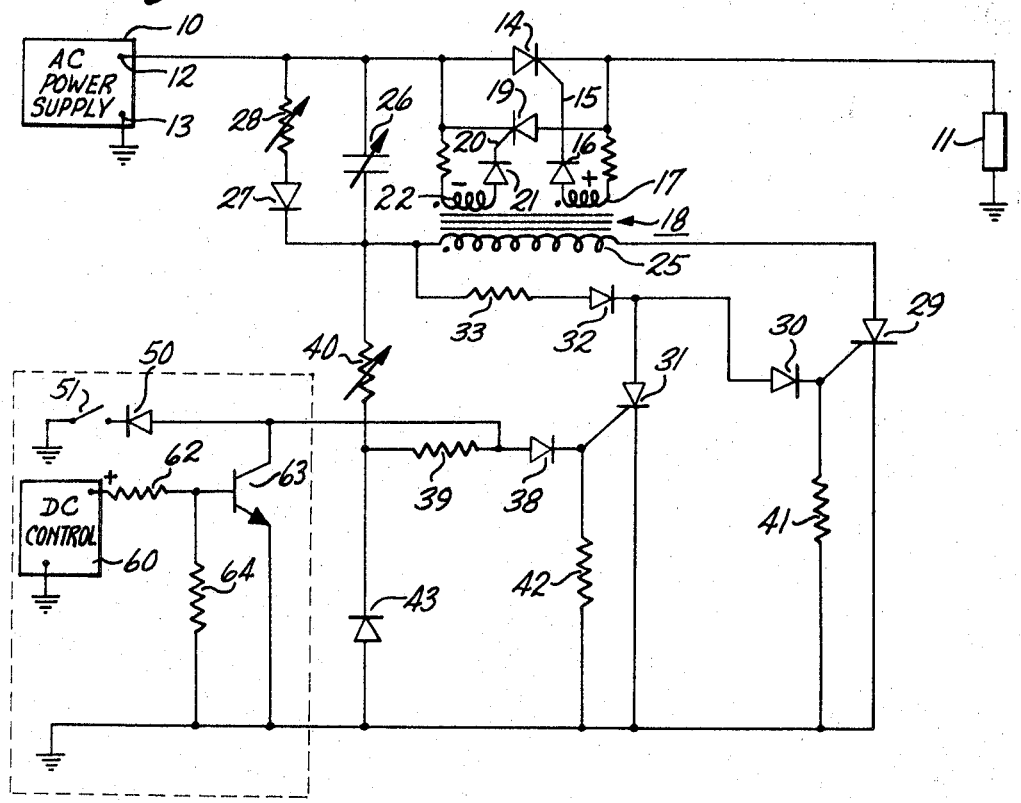

May 6, 1969

E. S. BAKER 3,443,204

APPLICATION OF POWER AT ZERO REFERENCE TIME

Filed July 21, 1966

Sheet 1 of 2

INVENTOR.
EDWARD S. BAKER
BY Christensen, Sanborn & Matthews
ATTORNEYS

May 6, 1969     E. S. BAKER     3,443,204
APPLICATION OF POWER AT ZERO REFERENCE TIME
Filed July 21, 1966     Sheet 2 of 2
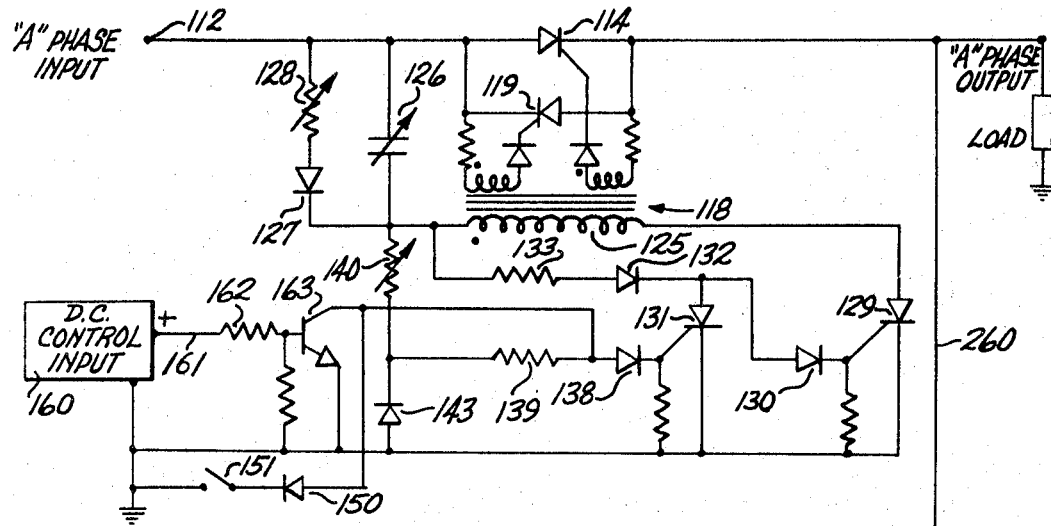
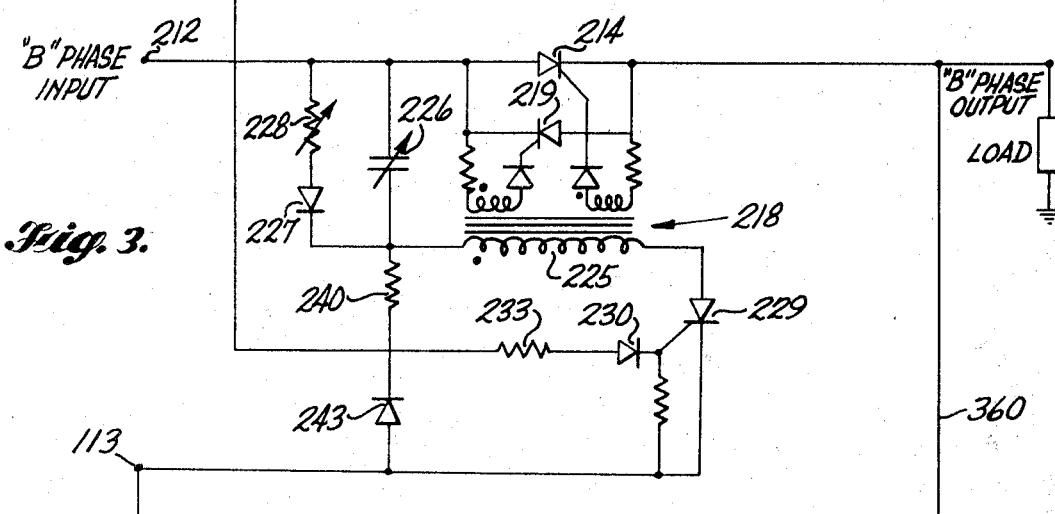
Fig. 3.
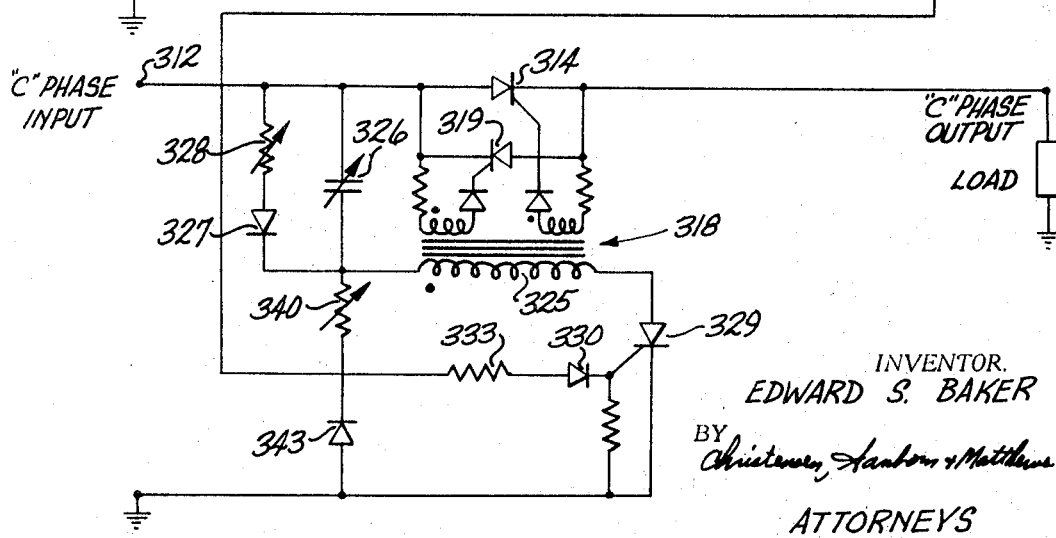
INVENTOR.
EDWARD S. BAKER
BY
ATTORNEYS

United States Patent Office 3,443,204
Patented May 6, 1969

3,443,204
APPLICATION OF POWER AT ZERO REFERENCE TIME
Edward S. Baker, Seattle, Wash., assignor to The Boeing Company, Seattle, Wash., a corporation of Delaware
Filed July 21, 1966, Ser. No. 566,983
Int. Cl. G05f *3/04*
U.S. Cl. 323—24         13 Claims The present invention relates to solid state current switching circuits and more particularly to an improved synchronized solid state relay.

Devices and circuits for turning current on and off to a given load are typically referred to as "relays" with the terminology "solid state relay" having grown up in recent years as referring to current control circuits making use of solid state components such as transistors, silicon controlled rectifiers (SCR's), Triacs, and others. When used in systems where radio frequency interference presents a problem, turn-on and turn-off of power to the load should occur at a time when the line voltage is at zero. Devices such as SCR's inherently always turn off very close to zero sine wave but can be turned on at almost any time when the anode is positive with respect to the cathode. However if turn-on occurs at any point other than sine wave zero a sharp pulse will be generated by the sudden conduction of the rectifier. This can produce serious interference with delicate equipment in the vicinity of the solid state relay. Circuits have been devised to overcome some of the problems associated with turn-on and turn-off of solid state relays but in general such arrangements typically require a large number of components of full-wave rectifier circuits if full-wave power is to be controlled between a power source and a load.

It is therefore an object of the present invention to provide an improved solid state relay.

Another object of the present invention is to provide an improved circuit for controlling the flow of current from a power supply to a load making use of a simplified circuit arrangement which insures initial application of power to the load at a time when the alternating voltage is crossing a zero reference axis and wherein full-wave power control is provided to the load without the need for a full-wave rectifying circuit in the control arrangement for the main current carrying switches.

A further object of the present invention is to provide a simplified solid state relay system for controlling each of the phases in a polyphase power supply so that power is applied and discontinued to a load in a noise-free manner.

A further object of the present invention is to provide bi-directional gating signals for oppositely poled current control devices such as SCR's utilizing a signal gating transformer and the stored energy associated therewith.

An additional object of the present invention is to provide an SCR gating circuit wherein successive gating signals are displaced in time from a main power supply alternating voltage by differing amounts so that a single gating circuit can be used for controlling oppositely poled SCR's.

The above and additional objects of the present invention are achieved through the use of a circuit arrangement wherein first and second main current carrying semiconductor elements (such as SCR's) are connected in parallel (but oppositely poled) between the power supply and the load. The main current carrying elements have a gating circuit associated therewith which includes separate secondary windings associated with the primary winding of a signal gating transformer. The primary winding of the signal gating transformer is connected in series circuit with a third current control device and a phase shifting network with the arrangement being such that the primary winding and the third device are provided with a voltage which leads the power supply voltage by a substantial time during at least one half of the power supply cycle. The third device is preferably an SCR and thus conducts only on alternate half cycles of the main power supply. When the third device has been provided with an appropriate gating signal, current flow through the primary winding leads the voltage conditions on a first one of the main current carrying devices in a manner such that gating current is actually provided for said first device prior to the time that the voltage conditions thereacross permit conduction of the device. Accordingly, the first main current carrying device is "pre-gated" and hence when the main power supply voltage passes through its zero reference level and first applies the necessary voltage conditions for conduction of the first device, power is immediately applied to the load in a noise-free manner.

In order to insure sufficient gating current for the first semiconductor current control device prior to actual turn-on thereof, the phase shift produced by the phase shift network is adjusted so that a substantial lead exists in the voltage applied to the gating transformer primary winding. One of the objects of the present system is to be able to utilize the stored energy associated with flow of current through the primary winding so that when the third device becomes nonconductive at the end of the half cycle the stored energy will give rise to a gating pulse for the second main current carrying device. However, due to the leading phase relationship of the transformer primary winding voltage as compared to the power supply voltage it is found that the pulse of energy produced by turn-off of the third device normally occurs prior to the time when the second main current carrying device is in a condition for being rendered conductive. Accordingly, the circuit of the present invention includes as part of the phase shift network a circuit arrangement whereby the pulse associated with collapse of the field of the primary winding is delayed in time so that its peak occurs at or slightly before the time when the voltage conditions on the second main current carrying device are appropriate for conduction of the second device. Thus the second device receives its necessary gating signal at the proper time for turn-on exactly at sine wave zero.

The third device mentioned above which controls the flow of current through the transformer primary winding is preferably connected in a zero-voltage sensing circuit so that power is always applied to the load at a predetermined time in the main power supply phase regardless of when an operator closes a switch. The system further includes a simplified circuit arrangement permitting the use of the system with conventional logic networks whereby grounding an input lead or applying a relatively low voltage thereto will turn the relay system "ON" initially at sine wave zero.

Figure 2:
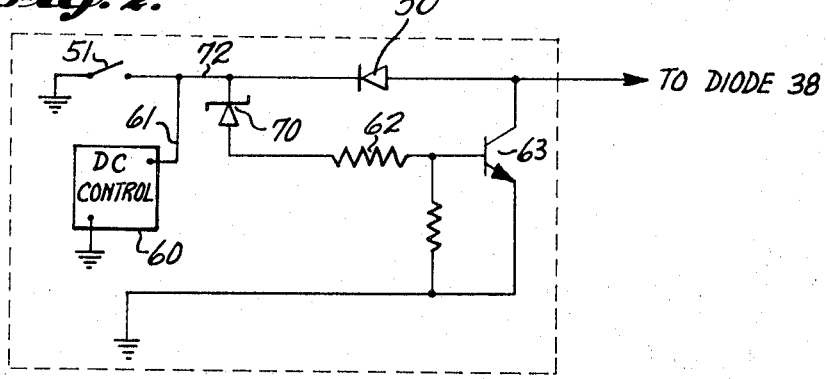

The above as well as additional advantages and objects of the invention will be more clearly understood from the following description when read with reference to the accompanying drawings wherein, FIGURE 1 is a schematic circuit diagram of a preferred embodiment of the invention, FIGURE 2 is a schematic circuit diagram of input control circuit adapted for use in the circuit of FIGURE 1, and FIGURE 3 is a schematic circuit diagram of a preferred embodiment of the invention for controlling a three phase power supply.

In FIGURE 1 a preferred embodiment of the invention is illustrated as controlling the flow of current from an AC power supply 10 to a load 11. One of the power supply terminals 13 is illustrated as being connected to a point of reference potential referred to as ground while the other terminal 12 is connected through a current control device illustrated as an SCR 14 to the load 11 which is similarly illustrated as being grounded. The SCR 14 has a control or gate electrode 15 coupled through a diode 16 to the secondary winding 17 of a gating transformer 18. In a similar manner a second main current control device shown as a second SCR 19 has its gate electrode 20 connected through a diode 21 to the second secondary winding 22 of the gating transformer 18. The anode of SCR 14 and the cathode of SCR 19 are directly interconnected and connected to the power supply terminal 12, while the cathode of SCR 14 and the anode of SCR 19 are directly interconnected and connected to the nongrounded side of the load 11 and thus the devices 14 and 19 provide full wave control for the application of power from the supply 10 to the load 11.

As is well known in the art, a silicon controlled rectifier has the characteristic of being rendered conductive when its anode is positive with respect to its cathode and an appropriate gating current is applied to the gate electrode. Once the positive-to-negative voltage condition between the anode and cathode terminates the SCR becomes nonconductive and then remains nonconductive until a further gate signal is applied even though the appropriate anode-cathode voltage conditions are re-established.

The gating transformer 18 has a primary winding 25 which is connected to the power supply terminal 12 through a first circuit which includes the variable capacitor 26, and through a second parallel circuit which comprises the diode 27 and adjustable resistor 28. The opposite end of the primary winding 25 is connected to the anode of a third SCR 29 having its cathode connected to signal ground. The gate electrode of SCR 29 is connected through the diode 30 to the anode of a fourth SCR 31 similarly having its cathode connected directly to signal ground. The anode of SCR 31 is also connected through diode 32 and resistor 33 to the left end of the primary winding 25 and hence through the capacitor 26 as well as diode 27 and resistor 28 to the power supply terminal 12. The gate electrode of SCR 31 is connected through diode 38, resistor 39, and resistor 40 to the left end of primary winding 25, with each of the gate electrodes for SCR's 29 and 31 being grounded through resistors 41 and 42, respectively. A diode 43 is connected in series circuit with the variable resistor 40 and adjustable capacitor 26 during negative half cycles of the power supply by having its anode grounded and its cathode connected to the resistor 40.

It will be seen that the diode 43, the resistor 40 and capacitor 26 provide a phase shifting network which is effective during negative half cycles of the power supply 12. The voltage appearing on the left end of the primary winding 25 during such half cycles therefore leads the power supply voltage by a selected time. During positive half cycles of the terminal 12 it will be seen that the diode 43 is nonconductive, and also that SCR 31 is provided with recurring gating signals during positive half cycles of terminal 12 via the resistor 28, diode 27, resistor 40, resistor 39, and diode 38. Thus the SCR 31 is provided with gating signals so that it normally conducts on each alternate half cycle of the power supply 10. Since the SCR 31 has its anode-cathode circuit connected in parallel with the diode 30 and resistor 41 associated with SCR 29, the gate current for SCR 29 is shunted by SCR 31 and SCR 29 will be held nonconductive. Since the primary winding 25 is in series circuit with SCR 29, it will be seen that so long as SCR 31 holds SCR 29 nonconductive, the main current carrying SCRs 14 and 20 cannot receive gating signals and power cannot be applied to the load 11.

The turn-on circuit for the system of FIGURE 1 is shown as including a diode 50 having its anode connected to the anode of diode 38 and its cathode connected to one terminal of a selectively operable grounding switch 51. When the switch 51 is closed and the cathode of diode 50 is connected to ground, it will be seen that gating current for SCR 31 is shunted by diode 50. If this is done when SCR 31 is already conducting the condition of the circuit will not be changed until SCR 31 "turns-off" due to terminal 12 going negative. Then thereafter SCR 31 cannot become conductive so long as switch 51 is closed. As a result, the SCR 29 will be provided with gating current on alternate half cycles of the AC power supply 12 and thus will conduct during such alternate half cycles. The resulting operation is as follows.

As previously described, the phase relationship of the voltage on the left end of primary winding 25 is such that the voltage thereon leads the power supply voltage by several degrees (in one embodiment the components were adjusted to provide a 45° phase lead). Since the SCR 31 after having once been rendered conductive remains conductive until the voltage on its anode with respect to its cathode is removed, it will be seen that regardless of when the switch 51 is closed the SCR 29 will be held nonconductive until start of the half cycle following closing of the switch 51. Then as the left end of winding 25 goes positive (leading the power supply voltage by 45° and hence actually starting during the last portion of the half cycle when the power supply voltage on terminal 12 is negative) the SCR 29 will conduct and current will flow through the primary winding 25. The windings 17 and 22 are such that this current flow in the primary winding 25 induces a voltage in secondary winding 17 of the proper polarity for the application of gating current to SCR 14 while the polarity of the winding 22 is such that during this current flow through primary winding 25 the SCR 19 receives no gating current. During this initial current flow the anode of SCR 14 is negative with respect to its cathode and therefore cannot conduct even though the device is being provided with gating current. However as soon as the voltage of terminal 12 passes through the zero reference axis, it will be seen that all necessary conditions for conduction of SCR 14 are satisfied and, accordingly, that device turns on exactly at the zero crossing of the power supply voltage. Once rendered conductive it then remains conductive for the positive half cycle of terminal 12 even though gating current might be removed from its gate electrode 15.

If the diode 27 and resistor 28 were not in the circuit, it will be seen that the SCR 29 would become nonconductive well in advance of the time when the power supply terminal 12 completes its positive half cycle. When the SCR 29 does become nonconductive, the termination of current flow through primary winding 25 gives rise to a pulse in the secondary winding 22 of the proper polarity for providing a gating signal to SCR 19. This gating signal should occur at or slightly prior to the time when the voltage of terminal 12 crosses the zero voltage reference axis so that SCR 19 is provided with an appropriate gating signal for "zero turn-on." Thus it will be seen that the phase relationship of the turn-off of SCR 29 and associated collapse of the field of primary winding 25 must be adjusted during the positive half cycle of the power supply to insure proper timing of the gating signal for SCR 19. The diode 27 and resistor 28 perform this function, since it will be seen that as the voltage on capacitor 26 decreases during the positive half cycle of terminal 12, the diode 27 will become conductive and hence the amount of phase shift as seen by the SCR 29 is decreased during positive half cycles of terminal 12 causing the termination of current flow through SCR 29 to be shifted in time such that an in-phase relationship with respect to the power supply voltage is approached. The degree of phase lead during this positive half cycle is readily controlled by adjustment of the resistor 28 and is set such that the pulse in secondary winding 22 is generated just slightly ahead of the time when the voltage conditions on SCR 19 first become proper for conduction of SCR 19. As a result the SCR 19 becomes conductive as the power supply voltage is crossing a zero reference axis and the turn-on of SCR 19 is substantially noiseless. As the voltage on power supply terminal 12 goes negative, with SCR 19 turning on and SCR 14 turning off, diode 27 again becomes nonconductive.

Thus it is found that a substantial phase lead is provided on the left end of primary winding 25 during the later portion of the half cycle when terminal 12 is negative so that "pre-gating" of SCR 14 occurs, with the degree of phase lead changing during the positive half cycle so that the gate signal for SCR 19 is derived from collapse of the field associated with primary winding 25. As a result it will be seen that power is initially applied to the load through the SCR 14 in a noise-free manner and then thereafter the SCR's 14 and 19 are repeatedly provided with gating signals to insure continued noise-free turn-on and turn-off.

It should be noted that the supply of power to the load terminates in a noise-free manner regardless of when the switch 51 is opened. That is, since the SCR 29 remains conductive once rendered conductive until its anode voltage is removed, the fact that SCR 31 is provided with a gating signal at any time and becomes conductive has no effect on the SCR 29 during the then existing cycle. Then during the succeeding half cycles when SCR 29 would normally be rendered conductive by a new gate signal, the SCR 31 again serves to hold SCR 29 nonconductive. It should be noted that the SCR 19 is always the last of the two SCR's 14 and 19 to be conductive when the switch 51 is opened, and thus the circuit is always returned to the proper condition for noise-free "turn-on."

In many applications it is advantageous to be able to control the turn-on of power to the load by the application of a relatively low voltage signal to the system. Thus in the embodiment of the invention shown in FIGURE 1 a DC control unit 60 is shown as having its positive terminal 61 connected through a resistor 62 to the base of an NPN transistor 63 which in turn has its collector directly connected to the anode of diode 38 and its emitter grounded. A base bias resistor 64 connects the base of transistor 63 to ground. The arrangement is such that the transistor 63 is normally nonconductive and hence has no effect on the gating signals applied to SCR 31 during alternate half cycles of the power supply. However, when the DC control unit 60 is operated to provide a positive signal on the base of transistor 63 the emitter-collector circuit of the transistor 63 effectively shunts gating current from the SCR 31 and accordingly turn-on of the main current control SCR 14 occurs in the manner above described by closing of the switch 51.

In some applications it is desirable to have an arrangement wherein a single input terminal is provided for controlling the application of power to a load and wherein turn-on of power is effected by either grounding the input terminal or by applying a positive signal thereto. Accordingly there is illustrated in FIGURE 2 an alternative embodiment of the control circuit of FIGURE 1. The circuit of FIGURE 2 will be seen to be similar to the control arrangement in dashed lines in FIGURE 1 and includes the transistor 63, diode 50, and in addition includes a voltage reference diode commonly referred to in the art as a Zener diode 70 having its cathode connected to the cathode of diode 50 and its anode connected through resistor 62 to the base of transistor 63. In this embodiment a single control electrode 72 is connected to the switch 51 and also the control terminal 61 of the DC control unit 60. The previously described circuit turn-on is achieved with the arrangement of FIGURE 2 either by closing switch 51 or by raising the voltage of DC control unit terminal 61 to a positive voltage. The only requirement is that the voltage applied by the DC control unit be greater than the breakdown voltage of the Zener diode 70. In one embodiment a two volt Zener diode was used with the DC control unit being capable of providing a voltage of between 3 and 30 volts for circuit turn-on.

In the system shown in FIGURE 1 wherein a substantial lead is provided for the gate signal of SCR 14, the gating signal can be made greater by somewhat delaying SCR 29 turn-on. This can be done by adjusting the value of resistor 41 so that the gate signal of SCR 29 rises to a greater value before SCR 29 turns-on and thus a faster rising gate signal for SCR 14 is obtained. As noted previously, resistor 28 and diode 27 across capacitor 26 control the phase of the stored energy pulse (i.e., during positive half cycles) while capacitor 26, resistor 40, and diode 43 provide the phase shift on the left end of primary 25 to obtain pre-gating SCR 14. Thus the two conditions of phase shift for the two required gating signals are readily and accurately adjusted. In one system resistor 40 was set at 20,000 ohms (20K) with a 0.25 mfd. capacitor 26 to obtain a 45° phase lead. With resistor 28 set at 20K a proper delay of the stored energy pulse was obtained. Resistors 39, 41, 33 and 42 were 1K, 150 ohms, 15K, and 3.9K, respectively. C6B and C6F type SCR's 29 and 31 were used.

The teachings of the present invention can be utilized for controlling a polyphase power supply system so that the noise signals normally associated with turn-on of a polyphase system will be eliminated. Thus referring now to FIGURE 3, a three phase power supply control system will be described. The three phase system of FIGURE 3 will be seen to include many circuit components arranged in a manner substantially the same as that shown in FIGURE 1 with the exception that only the "A" phase of the three phase system is provided with an external control system. In the system illustrated in FIGURE 3 the "B" phase power is controlled by the application of "A" phase power to the load while the "C" phase power is controlled by the application of "B" phase power to the load. A three phase power supply 110 is shown as having three nongrounded supply terminals 112, 212, and 312 as well as a grounded output terminal 113. The "A" phase power to the load is controlled by the back-to-back SCR's 114 and 119 arranged with their respective gate electrodes coupled with the secondary windings of the gating transformer 118. The primary winding 125 is connected in series circuit between the power supply terminal 112 and ground via the adjustable capacitor 126 and the SCR 129 in a manner substantially identical to the circuit arrangement illustrated in FIGURE 1. It will be seen that the gate electrode for SCR 129 is coupled through the diode 130 to the anode of the SCR 131 and is also connected through the diode 132 and resistor 133 to the left end of the primary winding 125. An adjustable resistor 128 and a diode 127 are connected in parallel with the adjustable capacitor 126 and serve the same function in FIGURE 3 as do the similar components 28 and 27 in FIGURE 1. The left end of primary winding 125 is similarly connected through the adjustable resistor 140 and the diode 143 to signal ground so that a leading voltage will be provided on the left end of the primary winding 125 during alternate half cycles of the "A" phase voltage. The resistor 128 and diode 127 serve to effectively bring the voltge on the left end of primary winding 125 into phase with the "A" phase voltage during alternate positive half cycles of the "A" phase voltage in the manner previously described for FIGURE 1.

As in the embodiment of FIGURE 1, the SCR 131 is adapted to be provided with appropriate gating signals via the gating diode 138 so that the SCR 131 will normally be conductive during alternate half cycles of the "A" phase voltage and hence the SCR 129 will be maintained nonconductive. Under such conditions, neither of the main current control SCR's 114 and 119 can receive a gating signal and, accordingly, power cannot be applied from the "A" phase terminal 112 to the load.

The "B" phase and "C" phase control circuitry is substantially identical to that described for the "A" phase with the exception that the "A" phase power is controlled by an external control circuit (described hereinafter), whereas the "B" and "C" phase power is controlled respectively by the "A" and "B" phase output voltages.

Thus the SCR's 214 and 219 are connected in back-to-back circuit arrangement between the "B" phase output terminal 212 and the load with the SCR's 214 and 219 having their gate electrodes coupled with separate secondary windings on the gating transformer 218. The primary winding 225 is connected in series with the SCR 229 and the capacitor 226, the resistor and diode 228 and 227 being connected in parallel with capacitor 226 in a manner similar to that previously described with respect to FIGURE 1. It should be noted that the gate electrode of SCR 229 instead of being connected to the "B" phase power supply or to the anode of an additional SCR is connected through the diode 230, resistor 233, and lead 260 to the cathode of SCR 114 and hence to the "output" side of the "A" phase power. Thus when power is provided from the "A" phase terminal 112 to the load, gating signals will be provided to the SCR 229 and hence appropriate gating signals will be provided for the SCR's 214 and 219. It should also be noted that so long as "A" phase power is not provided to the load, the SCR 229 cannot receive gating signals and, accordingly, power cannot be provided through the SCR's 214 and 219 which are connected in circuit with the "B" phase output terminal 212.

The circuit arrangement for the "C" phase power supply control is substantially identical to that described for the "B" phase power supply control with the various circuit components being identified by reference numbers increased by a factor of 100 over those described with reference to the "B" phase power supply control. The SCR 329 which controls the flow of current through primary winding 325 has its gate electrode coupled through diode 330, resistor 333, and lead 360 to the "B" phase output.

It is desirable in many circumstances to have the capability of supplying power to a load under a number of different input control conditions. Thus in the embodiment of the invention illustrated in FIGURE 3 the input control circuitry is substantially identical to that of FIGURE 1 and includes an NPN transistor 163 having its collector connected to the junction of resistor 139 and diode 138 so that the transistor collector is provided with a positive voltage which is in phase with the voltage on the left end of primary winding. The base of transistor 163 is connected via resistor 162 to the positive output terminal 161 of the DC control unit 160. The emitter of transistor 163 is grounded with an appropriate bias resistor being connected between the base and ground.

A switch 151 having its contacts normally maintained open is connected between the collector electrode of transistor 163 and signal ground via the diode 150. The arrangement is such that when switch 151 is closed the collector electrode is grounded and thus the gate electrode of SCR 131 cannot receive a gate signal. In a similar manner a positive signal on output 161 of unit 160 renders transistor 163 conductive so that SCR 131 cannot receive a gate signal and hence SCR 129 can turn on.

The operation of the circuit of FIGURE 3 is as follows. With the switch 151 open and control unit 160 not providing a signal to the base of transistor 163, an appropriate gating signal is recurringly provided to the gate electrode of SCR 131 and accordingly, as described in connection with FIGURE 1, the SCR 131 normally conducts and SCR 129 is held against conduction. As a result current flow through primary winding 125 is prohibited and neither of the SCR's 114 and 119 can conduct. Therefore no power is applied to the load. If the DC control unit 160 applies a positive voltage (in the order of 1 to 30 volts in one system) to its output terminal 161, the transistor 163 is rendered conductive so that the signal normally applied to the gate of SCR 131 is shunted to ground and SCR 131 does not conduct. Once this occurs, then the first time thereafter that the left end of transformer primary winding 125 goes positive (following the time when the SCR 131 last conducts) the SCR 129 will be provided with a gating signal and hence will conduct in the manner previously described with reference to FIGURE 1. Power will therefore be applied from the "A" phase terminal 112 to the load. The same result is achieved if the switch 151 is closed, since when this occurs any gate signals for SCR 131 will be grounded and hence SCR 129 will be permitted to conduct and provide the necessary current flow through primary winding 125 for the gating signals of SCR's 114 and 119. In each case it should be noted that the SCR 114 is the first of the pair of SCR's 114 and 119 to conduct and that it is "pre-gated" due to the leading voltage conditions on the left end of primary 125 when the SCR 129 first conducts. Then at the end of the negative half cycle when the terminal 112 goes positive and diode 127 conducts, the voltage on primary winding 125 effectively comes into phase with the "A" phase voltage so that the phase lead is substantially decreased and the energy stored in the field is made to collapse at the proper instant for generation of a gating pulse in the secondary winding associated with the gate electrode of SCR 119 to insure noise-free turn-on thereof.

As is well known in the art, the "B" phase voltage in a three phase system lags the "A" phase by 120° and the "C" phase lags the "B" phase by 120°. Thus the "B" phase terminal 212 is always negative when the SCR 114 first conducts and remains negative until 30° after initial conduction of SCR 114. Thus by connecting the cathode of SCR 114 to the gate electrode of SCR 229 via lead 260, it will be seen that the SCR 229 will be provided with a gate signal which leads the anode of SCR 214 by 30°. In order to provide the necessary current flow through primary winding 225 at this time the capacitor 226, resistor 240 and diode 243 are provided and serve the function previously described by their corresponding counterparts in FIGURE 1 and in the "A" phase control circuit. Thus it will be seen current flow starts through primary winding 225 in advance of the time when the anode of SCR 214 goes positive and hence the necessary conditions are fulfilled for pre-gating of SCR 214. Thus SCR 214 turns on exactly at the first zero crossing of the "B" phase voltage following the conduction of SCR 114. It will also be seen that the necessary gating signals for the SCR 219 will occur in the delayed manner previously described due to the presence of resistor 228 and diode 227.

The cathode of SCR 214 is connected to the gate of SCR 329 in the "C" phase control and thus the above operation described with reference to the "B" phase control will occur with the necessary pre-gating signals for SCR 314 as well as the "delayed" gating signals for SCR 319 being provided. As a result repeated noise-free turn-on and turn-off of the various SCR's 114, 214, 314, 119, 219, and 319 repeatedly occurs so long as the SCR 131 is not provided with a gating signal.

When the positive signal is removed from terminal 161, or switch 151 is opened, it will be seen that the SCR 131 is again in condition to receive a gating signal. Since the SCR 129 after having once been rendered conductive remains conductive until the end of the time when its anode is positive with respect to its cathode, it will be seen that the application of a gate signal to the SCR 131 cannot affect the condition of SCR 129 until it has been rendered nonconductive by the end of a half cycle. Then with SCR 131 again being provided with gating signals the SCR 129 is held nonconductive in the manner previously described and no further gating of the SCR's 114 and 119 can occur. As a result, the gating of SCR's 229 and 329 discontinues and the application of power to the load is discontinued in all three phases in a noise-free manner. In each case the "controller" for each of the phases always completes a given cycle and turns "off" at the end of a negative half cycle. Thus the circuit is always in a condition for re-energization in the manner previously described. As a result a convenient power supply control is provided for a three phase system.

There has thus been disclosed an improved solid state relay for controlling the application of current from a power supply to a load in a noise-free manner making use of a simplified circuit arrangement which does not require a full-wave rectifier in the gating circuits for the main SCR's. While the circuit has been disclosed as using SCR's as the main current control devices, it should be noted that equivalent devices such as a single Triac (which corresponds in general to a pair of SCR's connected back-to-back) could be utilized.

What is claimed is:

1. A power supply control system comprising in combination: first and second controlled rectifiers each having a gate electrode and having the anode and cathode of one rectifier connected respectively to the cathode and anode of the other for controlling full wave power from an alternating power supply to a load; a transformer having a primary winding and first and second secondary windings respectively coupled with said gate electrodes; a unidirectional current control device connected in series circuit with said primary winding for controlling the flow of current therethrough; first timing circuit means connected to the anode of one of said rectifiers, to said primary winding, and to said device for providing a voltage to said primary winding and said device which leads the phase of the voltage on the anode of said one rectifier by a first amount, and second timing circuit means connected to said primary winding, said device, and to said first timing circuit means for decreasing the amount of said phase lead following conduction of said one rectifier.

2. A system as defined in claim 1 wherein said first timing circuit means includes a capacitor connected in series circuit with the primary winding of said transformer and a diode connected in parallel with the series circuit of said device and said primary winding, and wherein said second timing circuit means includes a second diode connected in parallel with said capacitor and in series with said primary winding.

3. A current control system for controlling the application of power from first and second input electrodes to a pair of output electrodes having a load connected thereacross comprising in combination: first and second controlled rectifier devices connected in back-to-back circuit relation between the first input electrode and one of the output electrodes and each having a gate electrode; a transformer having a primary winding and first and second secondary windings respectively connected to the gate electrodes of said first and second rectifiers; first timing circuit means including a capacitor connected to said first electrode and to a first end of said primary winding; a first impedance element and a first diode connected in parallel with said first timing circuit means; a third controlled rectifier device having an anode connected to a second end of said primary winding and a cathode connected to the second power input terminal; a fourth controlled rectifier device having a cathode connected to said second power input terminal and having an anode; circuit means connecting the anode of said fourth rectifier to the gate electrode of said third rectifier; circuit means connecting the anode of said fourth rectifier to the said first end of said primary winding; second timing circuit means including a second impedance element and a second diode connecting said first end of said primary winding to said second power input terminal, said diode having its cathode coupled to said first end of said primary winding; and control circuit means coupled with the gate electrode of said fourth rectifier.

4. The system as defined in claim 3 wherein said control circuit means includes a transistor having its emitter-collector circuit connected to the gate electrode of said fourth device and to the second power input terminal and having a base electrode for receiving signals to selectively render said transistor conductive.

5. The system as defined in claim 3 wherein said first diode has its cathode connected to said first end of said primary winding and its anode coupled with said first power input terminal.

6. A system as defined in claim 5 including a third diode connected between the gate electrode of said third device and the anode of said fourth device and a fourth diode connected to the anode of said fourth device and to said first end of said primary winding.

7. A system as defined in claim 3 wherein said control circuit means includes a diode and switch means connected in series circuit between the gate electrode of said fourth device and said second power input terminal.

8. A power control system comprising in combination: first and second controlled rectifier devices each having an anode, a cathode and a gate electrode, the cathode of said first device being connected to the anode of said second device and the anode of said first device being connected to the cathode of said second device; a transformer having a primary winding and first and second secondary windings respectively connected to the gate electrodes of said first and second devices; first circuit means including a capacitor connected between the anode of said first device and a first end of said primary winding; second circuit means connected in parallel with said first circuit means and including a diode having its cathode coupled with said first end of said primary winding; a third controlled rectifier having its anode connected to a second end of said primary winding, a gate electrode coupled with the first end of said primary winding, and a cathode circuit; third circuit means including a second diode having its anode coupled with the cathode circuit of said third rectifier and a cathode coupled with said first end of said primary winding; and control circuit means coupled with the gate electrode of said third rectifier for selectively shunting gating signals away from the gate electrode of said third device.

9. A system as defined in claim 8 wherein said control circuit means includes a fourth controlled rectifier having an anode coupled with the gate electrode of said third rectifier, a cathode coupled with the cathode of said third rectifier, and a gate electrode coupled with said first end of said primary winding.

10. A system as defined in claim 9 wherein said control circuit means further includes a transistor having its emitter-collector circuit connected in parallel circuit with said second diode and a base electrode receiving control signals for selectively rendering the transistor conductive.

11. A system as defined in claim 8 and further including fifth and sixth main current carrying controlled rectifier devices each having an anode, a cathode and a gate electrode with the anode of said fifth device being connected to the cathode of said sixth device and the cathode of said fifth device being connected to the anode of said sixth device; a second transformer having a primary winding and first and second secondary windings respectively coupled with the gate electrodes of said fifth and sixth devices; fifth circuit means including a second capacitor connected between the anode of said fifth controlled rectifier and a first end of said second primary winding; sixth circuit means connected in parallel with said fifth circuit means and including a diode having its cathode connected to said first end of said second primary winding; a sixth controlled rectifier having an anode connected to a second end of said second primary winding, a gate electrode, and a cathode circuit; seventh circuit means including a diode having its cathode coupled with said first end of said second primary winding and its anode coupled with the cathode of said sixth controlled rectifier; and circuit means connecting the cathode of said first device with the gate electrode of said sixth device whereby said sixth device is rendered conductive to permit the flow of current through the primary winding of said second transformer only after power has been provided through said first controlled rectifier.

12. A system as defined in claim 11 and further including seventh and eighth controlled rectifiers each having an anode, a cathode and a gate electrode and wherein the anode of said seventh rectifier is coupled with the cathode of said eighth rectifier and the cathode of said seventh rectifier is coupled with the anode of said eighth rectifier; a third transformer having a primary winding and first and second secondary windings respectively coupled with the gate electrodes of said seventh and eighth controlled rectifiers; circuit means including a capacitor connected between the anode of said seventh controlled rectifier and a first end of said third primary winding; circuit means including a diode having its cathode connected to the said first end of said third primary winding and its anode coupled with the anode of said seventh rectifier; a ninth controlled rectifier having an anode coupled with a second end of said third primary winding and a cathode circuit; circuit means connected in parallel with the series combination of said primary winding and said ninth rectifier and including a diode having its cathode coupled with said first end of said third primary winding; and circuit means coupling the gate electrode of said ninth rectifier with the cathode of said fifth rectifier.

13. The system as defined in claim 12 wherein the cathodes of said third, sixth, and ninth controlled rectifiers are interconnected and wherein the anodes of said first, fourth, and seventh controlled rectifiers are respectively connected with a different one of the output terminals of a three phase power supply system.

References Cited

UNITED STATES PATENTS

| | | |
|---|---|---|
| 3,204,113 | 8/1965 | Snygg. |
| 3,283,177 | 11/1966 | Cooper. |
| 3,319,152 | 5/1967 | Pinckaers. |
| 3,321,668 | 5/1967 | Baker _____ 317—11 |

JOHN F. COUCH, *Primary Examiner.*

A. D. PELLINEN, *Assistant Examiner.*

U.S. Cl. X.R.

307—133, 252; 317—11; 323—38